(12) United States Patent
Trevillyan et al.

(10) Patent No.: US 7,914,431 B2
(45) Date of Patent: Mar. 29, 2011

(54) SELF-CLEANING MOWER GROUND ROLLER ASSEMBLY MOUNTING SYSTEM

(75) Inventors: Bart L. Trevillyan, Valley Springs, SD (US); Brian E. Hardy, Sioux Falls, SD (US); Mark A Otten, Crooks, SD (US); Allen C Larson, Sioux Falls, SD (US)

(73) Assignee: Alamo Group, Inc., Seguin, TX (US)

( * ) Notice: Subject to any disclaimer, the term of this patent is extended or adjusted under 35 U.S.C. 154(b) by 60 days.

(21) Appl. No.: 12/380,813

(22) Filed: Mar. 4, 2009

(65) Prior Publication Data

US 2010/0115907 A1 May 13, 2010

Related U.S. Application Data

(63) Continuation-in-part of application No. 12/291,655, filed on Nov. 12, 2008.

(51) Int. Cl.
*B25F 5/02* (2006.01)
*A01D 34/52* (2006.01)

(52) U.S. Cl. .......................................... 492/47; 56/294
(58) Field of Classification Search ............... 492/47; 56/294, 249

See application file for complete search history.

(56) References Cited

U.S. PATENT DOCUMENTS

| 1,876,169 | A | * | 9/1932 | Riemenschneider | 56/262 |
| 2,777,274 | A | * | 1/1957 | Beaumont | 56/249 |
| 3,662,528 | A | * | 5/1972 | Akgulian et al. | 56/249 |
| 3,680,293 | A | * | 8/1972 | Klemenhagen | 56/249 |
| 3,843,216 | A | * | 10/1974 | Campbell | 384/152 |
| 4,481,757 | A | * | 11/1984 | Tsuchiya | 56/16.9 |
| 4,947,630 | A | * | 8/1990 | Rich et al. | 56/249 |
| 5,394,681 | A | * | 3/1995 | Nolan et al. | 56/249 |
| 5,950,409 | A | * | 9/1999 | Davies | 56/249 |

* cited by examiner

*Primary Examiner* — David P Bryant
*Assistant Examiner* — Jacob J Cigna

(57) ABSTRACT

A self-cleaning mounting system for a ground roller assembly to be used on a mower such as a flail mower including a stationary sleeve bearing positioned on mounting shafts extending from either end of the ground roller. The stationary sleeve bearing is positioned in a housing which is vertically positionably with respect to the mower housing. The housing includes a stationary helical flight and a seal guard which fits within the ground roller. The stationary sleeve bearing is protected on either end from dirt and debris getting between the inside surface of the stationary sleeve bearing and the outside surface of the mounting shafts on either end of the ground roller.

12 Claims, 4 Drawing Sheets

SELF-CLEANING MOWER GROUND ROLLER ASSEMBLY MOUNTING SYSTEM

CROSS REFERENCE TO RELATED APPLICATION

This application is a continuation-in-part of pending U.S. patent application Ser. No. 12/291,655 filed Nov. 12, 2008.

STATEMENT REGARDING FEDERALLY FUNDED RESEARCH AND DEVELOPMENT

The invention described in this patent application was not the subject of federally funded research or development.

FIELD

The present invention relates to mowers; more particularly, the present invention relates to those mowers using one or more ground rollers to regulate the depth of cut or the height of vegetation remaining once passing under a mower.

BACKGROUND

Tractor mounted mowers such as a flail mower or a reel-type mower typically include a ground roller assembly 130. The ground roller assembly 130 mounted to the rear of the mower housing 120 as shown in FIG. 1. A vertically positionable, rotatable ground roller assembly mounting system enables the ground roller assembly 130 be vertically positioned to vary the depth of cut or the height of the vegetation remaining after the mower assembly 110 moves over the ground.

Large mowers typically used alongside major roadways, use one or more sets of grease-type ball bearings, spherical roller bearings, or roller bearings for rotatably attaching the ground roller assembly to the mower housing. The sets of grease-type ball bearings, spherical roller bearings, or roller bearings are positioned on either end of the ground roller assembly 130. While effective for rotatably mounting the ground roller assembly, grease-type ball bearings, spherical roller bearings, or roller bearings present the following drawbacks: a) they are expensive, b) they require frequent checking and lubrication when operating within an environment filled with dust, debris, and water, such as the area immediately behind the cutting portion of a mower assembly, c) they are difficult and costly to replace, and d) the grease expelled from the bearings collects and holds dirt, which dirt eventually works its way into the bearings and reduces bearing life.

Ground roller assembly mounting bearings require proper maintenance to remain in working order. To properly maintain a ground roller assembly mounting system, the bearings contained therein must be both kept free of dirt and debris and lubricated regularly. Improper maintenance of one or more grease-type ball bearings, spherical roller bearings, or roller bearings often results in the costly and difficult replacement of these bearings.

Unfortunately, some mower operators, particularly the operators of flail-type mowers used alongside roads and highways, have a reputation for not properly cleaning and lubricating wear prone parts of mower assemblies. Accordingly, grease-type ball bearings, spherical roller bearings, and roller bearings on either end of the ground roller assembly often wear out prematurely during the mowing season. This premature wear results in increased maintenance and increased operational costs for owner of the mower.

Accordingly, a need remains in the art for a more easily and cheaply maintained ground roller assembly mounting system for use on a mower. More particularly a mounting system is required that both minimizes dirt and debris from entering the mounting system for the ground roller assembly and provides a rotational mounting system for the ground roller assembly that requires no lubrication. Such mounting system for a ground roller assembly should require less maintenance then prior art ground roller assembly mounting systems thereby reducing operating costs and increasing the usable life of the ground roller assembly mounting system portion of a mower.

SUMMARY

A self-cleaning ground roller assembly mounting system for use on a mower which both minimizes and removes dirt and debris and requires no lubrication is provided by the present invention.

Included within the disclosed self-cleaning ground roller assembly mounting system are a pair of sleeve bearings. Each sleeve bearing is positioned to be non-movable within a bearing housing. The bearing housing is vertically positionable with respect to the mower housing. Within the sleeve bearing, the mounting shafts on either end of the ground roller assembly are rotatably mounted.

Extending into the end of the of the ground roller assembly, the bearing housing is connected to a flexible bearing seal on the inboard end of the ground roller mounting shaft. The flexible bearing seal protects the sleeve bearing from entry of dirt and debris into the contact area between the outside of the ground roller mounting shaft and the inside of the sleeve bearing.

The vertically positionable bearing housing is positioned by being fixedly mounted to the vertically movable cut height adjustment bracket. Movement of the cut height adjustment bracket is guided between two retaining clips affixed to the mower housing. Cut height adjustment is made by turning an externally threaded fastener mounted on the mower housing within an internally threaded fastener attached to the cut height adjustment bracket.

Positioned within the vertically positionable bearing housing near the outboard end of the sleeve bearing is a thrust bearing. The thrust bearing limits the linear travel of the ground roller assembly mounting shaft with respect to the stationary sleeve bearing. An o-ring substantially surrounds the thrust bearing on the outboard end of the ground roller assembly mounting shaft. The o-ring protects the sleeve bearing from entry of dirt and debris into the contact area between the outside surface of the ground roller assembly mounting shaft and the inside surface of the sleeve bearing. A groove formed within the vertically positionable bearing housing holds the o-ring in place.

To further reduce maintenance of the self-cleaning ground roller assembly mounting system a seal guard is used to help eliminate and remove excess debris as well as preventing a build up of dirt in the seal area. Also included is a stationary helical flight affixed to the bearing housing. The stationary helical flight will auger debris out of the end of the rotating hollow ground roller during operation.

BRIEF DESCRIPTION OF THE DRAWING FIGURES

A better understanding of the self-cleaning ground roller assembly mounting system of the present invention may be had by reference to the following Description of the Embodiments as illustrated by the following drawing figures wherein.

DESCRIPTION OF THE EMBODIMENTS

Figure 1:
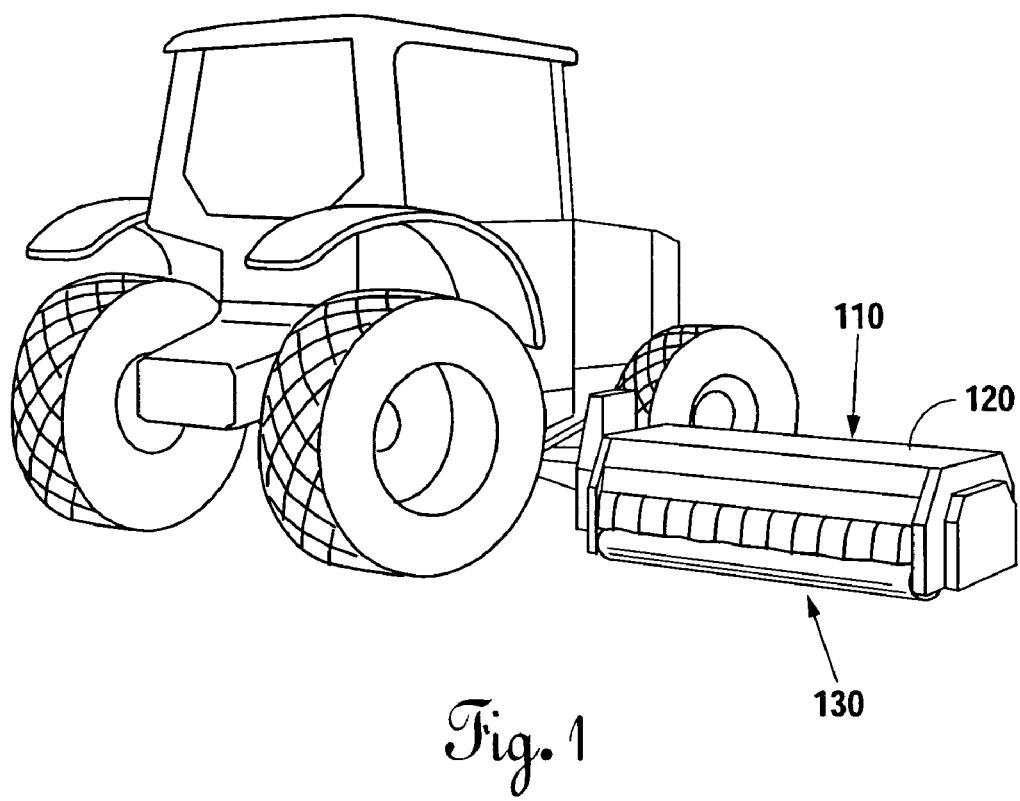
FIG. 1 is a rear perspective view of a tractor with a flail mower assembly mounted to the underside thereof.

As may be seen in FIG. 1, a ground roller assembly 130 is positioned behind the forward or cutting portion 120 of a flail mower assembly 110. The ground roller assembly 130 follows the cutting portion 120 of the flail mower assembly 110 as the flail mower assembly 110 moves across the ground. While the self-cleaning ground roller assembly mounting system 10 of the present invention is shown in use with a flail mower, those of ordinary skill in the art will understand that the system of the present invention may be used with those other types of mowers, such as a reel type mower, which includes a ground roller assembly for adjusting the depth of cut.

Figure 1A:
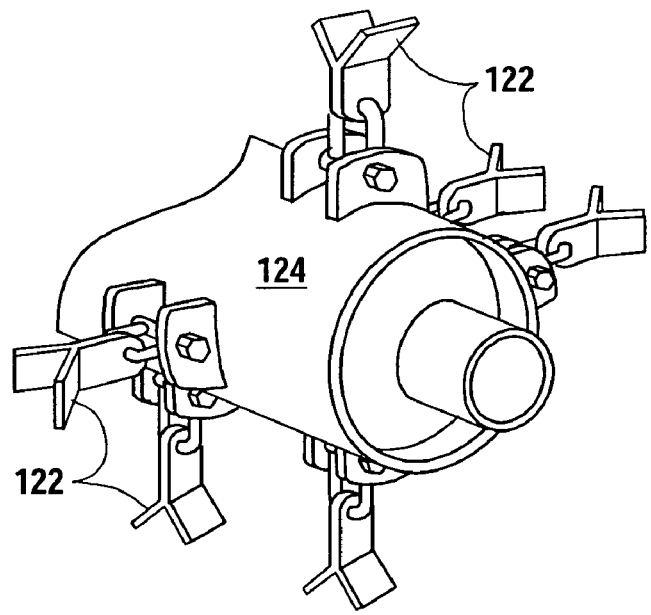
FIG. 1A is an exemplary perspective view of a plurality of flail knives hingedly mounted to a rotating cutter shaft.

As shown in FIG. 1A, the actual cutting of the vegetation is caused by the impact of the hingedly mounted flail knives 122 on the vegetation to be cut as the flail knives 122 rotate together with a rotating cutter shaft 124 which is driven by a motor 150. The dept of cut or the height of the vegetation remaining after being cut is regulated by the substantially vertical position of the ground roller assembly 130.

Figure 2:
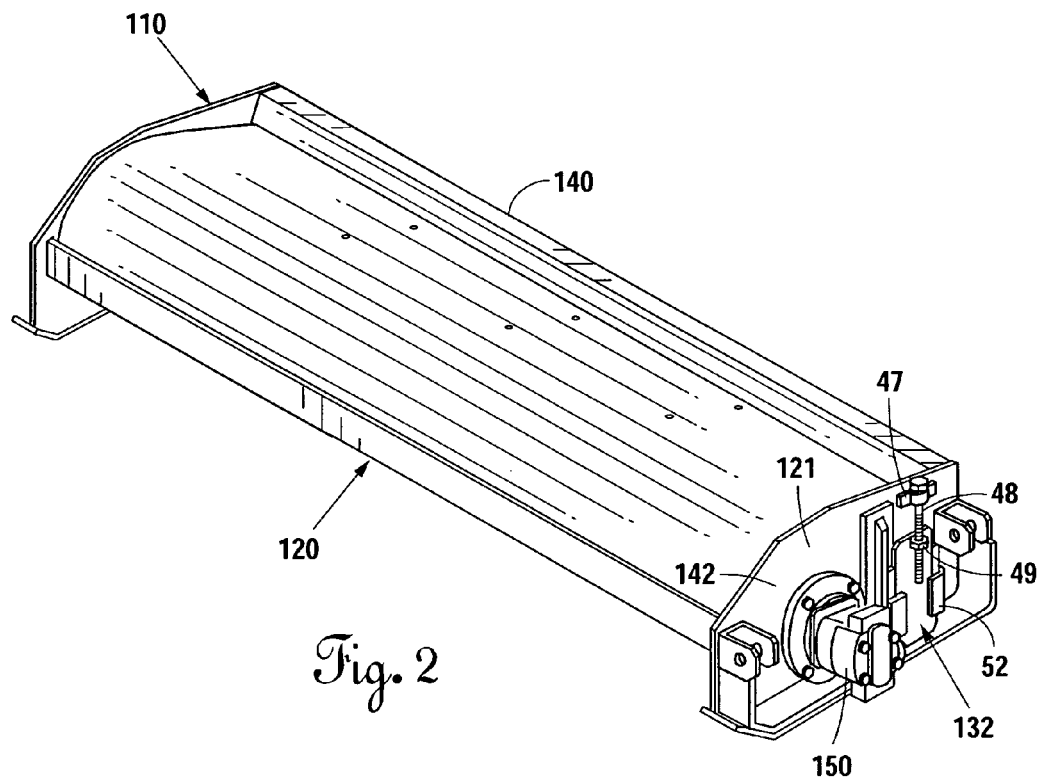
FIG. 2 is a perspective view of the front and side of a flail mower assembly showing the vertical adjustment for the ground roller assembly and the motor which provides rotational force to the rotating cutter shaft assembly which include the hingedly mounted flail knives.
Figure 3:
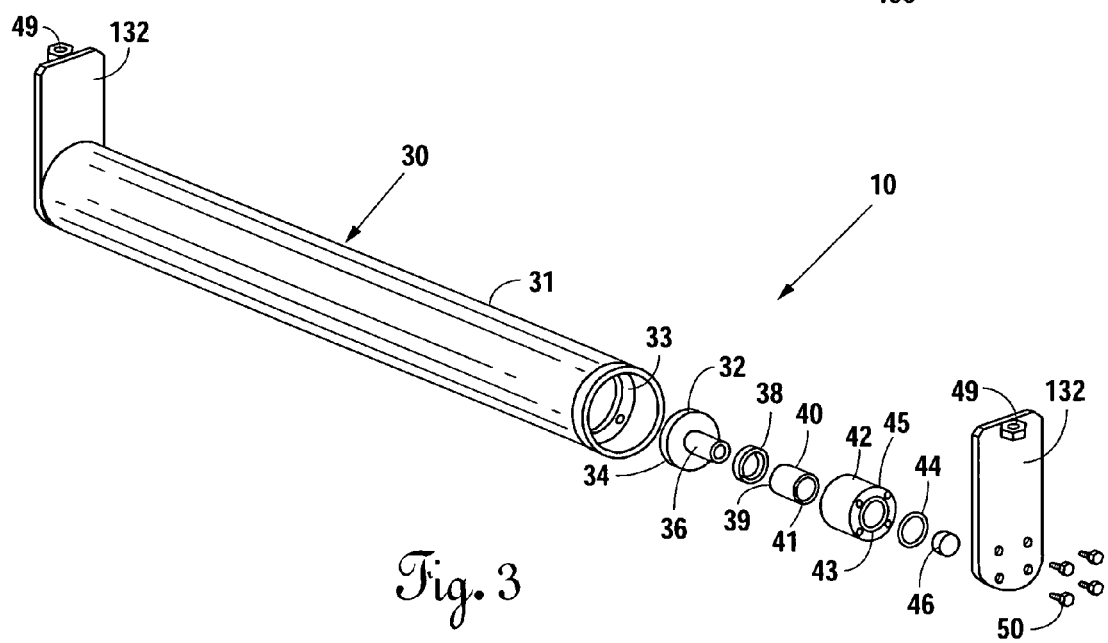
FIG. 3 is an exploded perspective view of the ground roller assembly mounting system of the present invention without the self-cleaning feature.

As shown in FIG. 2 and FIG. 3, the vertical positioning of the ground roller assembly 130 is accomplished by the use of an externally threaded fasteners 48 positioned on either end of the flail mower assembly 110. Each externally threaded fastener 48 mounted within bracket 47 to each end of 121 of the flail mower assembly 110. Each externally threaded fastener 48 is positioned to engage an internally threaded fastener 49. Each internally threaded fastener 49 is attached to a cut height adjustment bracket 132. Each cut height adjustment bracket 132 is positioned adjacent to the end plate 142 on either end 121 of the mower housing 140.

Turning the externally threaded fastener 48 within the internally threaded fastener 49 changes the vertical position of the cut height adjusting bracket 132. The cut height adjustment bracket is kept from turning by retention within retaining clips 52 affixed to the end plate 142 of the flail mower housing 140. Changing the vertical position of the cut height adjustment bracket 132 moves the ground roller assembly 130 up or down and thereby changes the dept of cut.

Figure 4:
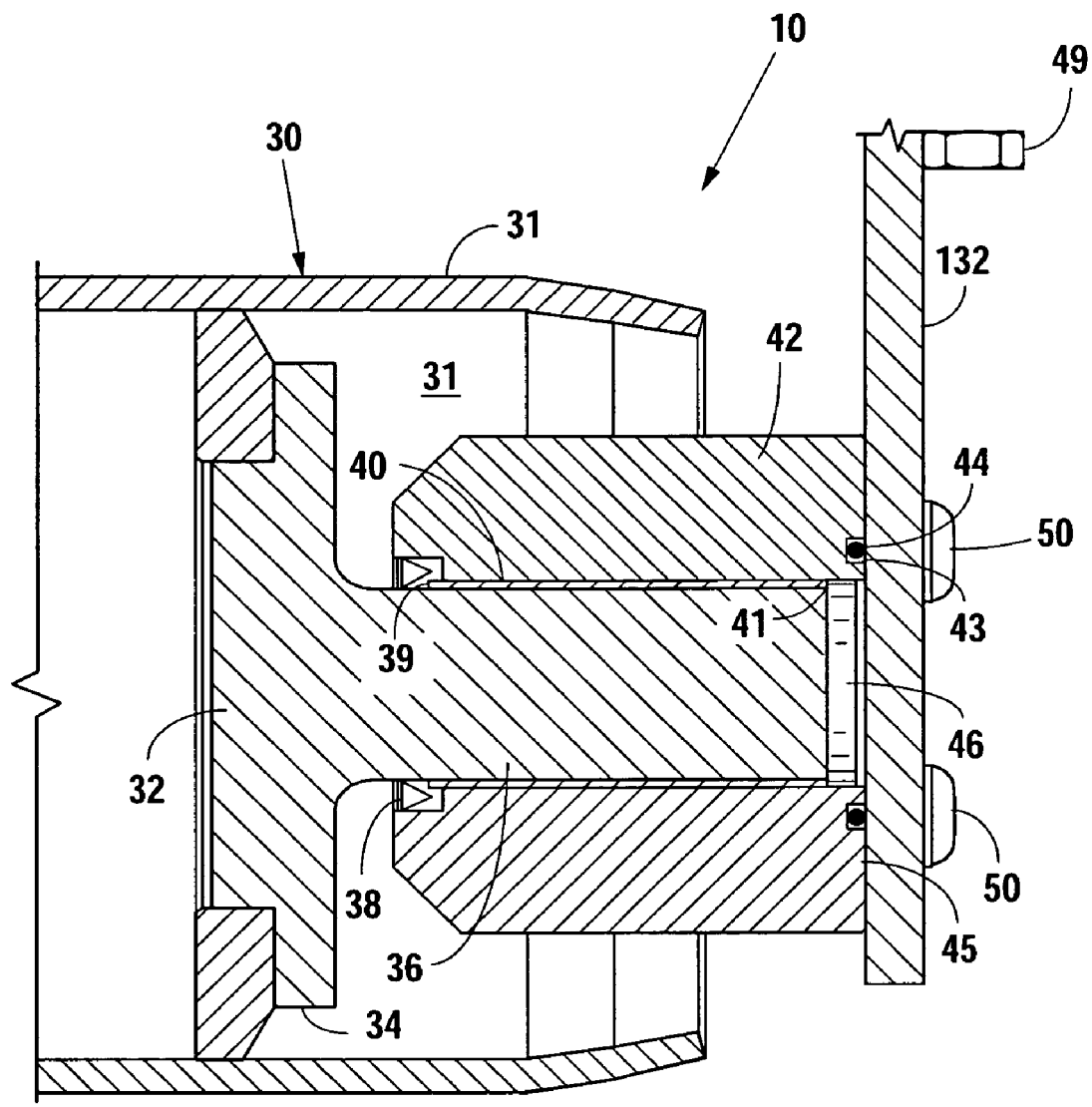
FIG. 4 is an elevational view, in partial section, of the assembled system shown in FIG. 3 showing the placement of a mounting shaft for the ground roller assembly within the ground roller assembly mounting system of the present invention.

Shown in FIG. 3 and in FIG. 4 is the assembly of the components included in the ground roller mounting assembly system 10 of the present invention.

The ground roller assembly 130 includes a hollow cylindrical member 31 having a length slightly shorter than the housing 140 for the cutting portion 120 of the flail mower assembly 110. The diameter of the hollow cylindrical member 31 may vary; however, the diameter of the hollow cylindrical member 31 is not critical to the disclosed invention as the system 10 of the present invention may be used with hollow cylindrical members having a variety of diameters.

Fitted within either end of the hollow cylindrical member 31 is a mounting shaft 32. The inboard end of each mounting shaft 32 has a large diameter portion 34 for interfitment within the inside 33 of the hollow cylindrical member 31. Extending outwardly from the large diameter portion 34 is a reduced diameter portion 36. When a mounting shaft 32 is placed within either end of the hollow cylindrical member 31, the long or rotational axis of the reduced diameter portions 36 are positioned to be co-axial with the long or rotational axis of the hollow cylindrical member 31 to assure that the ground roller assembly 130 rolls smoothly over the ground behind the mower assembly 110.

The reduced diameter portion 36 of each mounting shaft 32 on either end of the hollow cylindrical member 31 must be allowed to rotate as the ground roller assembly 130 rolls over the ground to properly position the ground roller assembly 130 behind the cutting portion 120 of the mower assembly. To enable the rotation of the reduced diameter portion 36 of each mounting shaft 32 on either end of the hollow cylindrical member 31, the reduced diameter portion 36 of the mounting shaft 32 is contained within a non-rotating, vertically adjustable greaseless sleeve bearing 40. The non-rotating, vertically adjustable greaseless sleeve bearing has an inboard end 39 and an outboard end 41.

The non-rotating, vertically adjustable, greaseless sleeve bearing 40 is mounted within a bearing housing 42. The bearing housing 42 is attached to the cut height adjusting bracket 132 so that each non-rotating, vertically adjustable greaseless sleeve bearing 40 is co-axial with the reduced diameter portion 36 of each mounting shaft 32. The bearing housing 42 extends within both ends of the hollow cylindrical member 31. The bearing housing 42 becomes vertically positionable with respect to the mower housing 140 by attachment to the cut height adjustment bracket by threaded fasteners 50.

In the preferred embodiment of the disclosed invention, the non-rotating, vertically adjustable, greaseless sleeve bearing 40 has a steel backing and a porous bronze inner structure with a PTFE overlay. That reduced diameter portion 36 of each ground roller mounting shaft 32 on each end of the hollow cylindrical member 31 has either chrome plated or a nitrided surface.

Positioned adjacent to the inboard end of each non-rotating, vertically adjustable, greaseless sleeve bearing 40 on either end of the hollow cylindrical member 31 in the preferred embodiment is a flexible bearing seal 38. The flexible nature of the bearing seal 38 prevents the entry of dirt and debris into the area between the outside of the reduced diameter portion 36 of the mounting shaft 32 and the interior surface of the non-rotating, vertically adjustable greaseless sleeve bearing 40. Various types of bearing seals may be used from an o-ring to a seal with a flexible cup seal, as shown in the preferred embodiment of FIG. 3. Other types of seals to include low friction contact components such as Teflon, rope, leather or rubber may also be used.

Located within the vertically adjustable bearing housing 42 is a thrust bearing 46. The thrust bearing 46 limits the axial movement of the reduced diameter portion 36 of the ground roller mounting shaft 32. Specifically, should the hollow cylindrical member 31 be caused to move a short distance axially, the thrust bearing 46 within the vertically adjustable bearing housing 42 will limit the axial movement of the hollow cylindrical member 31 by contact with the end of the reduced diameter portion 36 of the ground roller mounting shaft 32.

For further protection of the interface between the outside surface of the reduced diameter portion 36 of the ground roller mounting shaft 32 and the interior surface of the non-rotating, vertically adjustable sleeve bearing 40, an o-ring 44 is mounted in a groove 43 formed within the bearing housing 42. The groove 43 is positioned substantially around the thrust bearing 46 and adjacent to the outboard end of the non-rotating, vertically adjustable sleeve bearing 40.

Holding the o-ring 44 in position is the contact of the outboard face 45 of the adjustable bearing housing 42 with the inside surface of the cut height adjustment bracket 132. While a single o-ring 44 is shown in the preferred embodiment, those of ordinary skill in the art will understand that multiple o-rings may be used. Alternatively, other types of protective seals may be used to include gaskets or gels.

While the vertically adjustable bearing housing 42 is fixedly mounted to the vertical adjusting bracket 132 with screws 50 other attachment methods such as welding may be used. Retaining clips 52 maintain vertical adjusting brackets 132 in position horizontally, fore and aft and axially or the long axis of ground roller assembly 130. But, the machined depth of retaining clip 52 is slightly greater than the thickness of vertical adjustment bracket 132, thereby allowing the vertical adjustment bracket 132, vertically adjustable bearing housing 42, and greaseless bearing 40 to move slightly, axially in and out, and rotate slightly on the vertical axis of the vertical adjustment bracket 132 to provide alignment to the mounting shaft 32, and account for manufacturing tolerances. While the cut height adjustment bracket 132 vertically moves within the retaining clips 52 when the externally threaded fastener 48 is adjusted within the internally threaded fastener 49 attached to the cut height adjustment bracket 132 other movement and retaining mechanisms known to those of ordinary skill in the art may be used.

Figure 5:
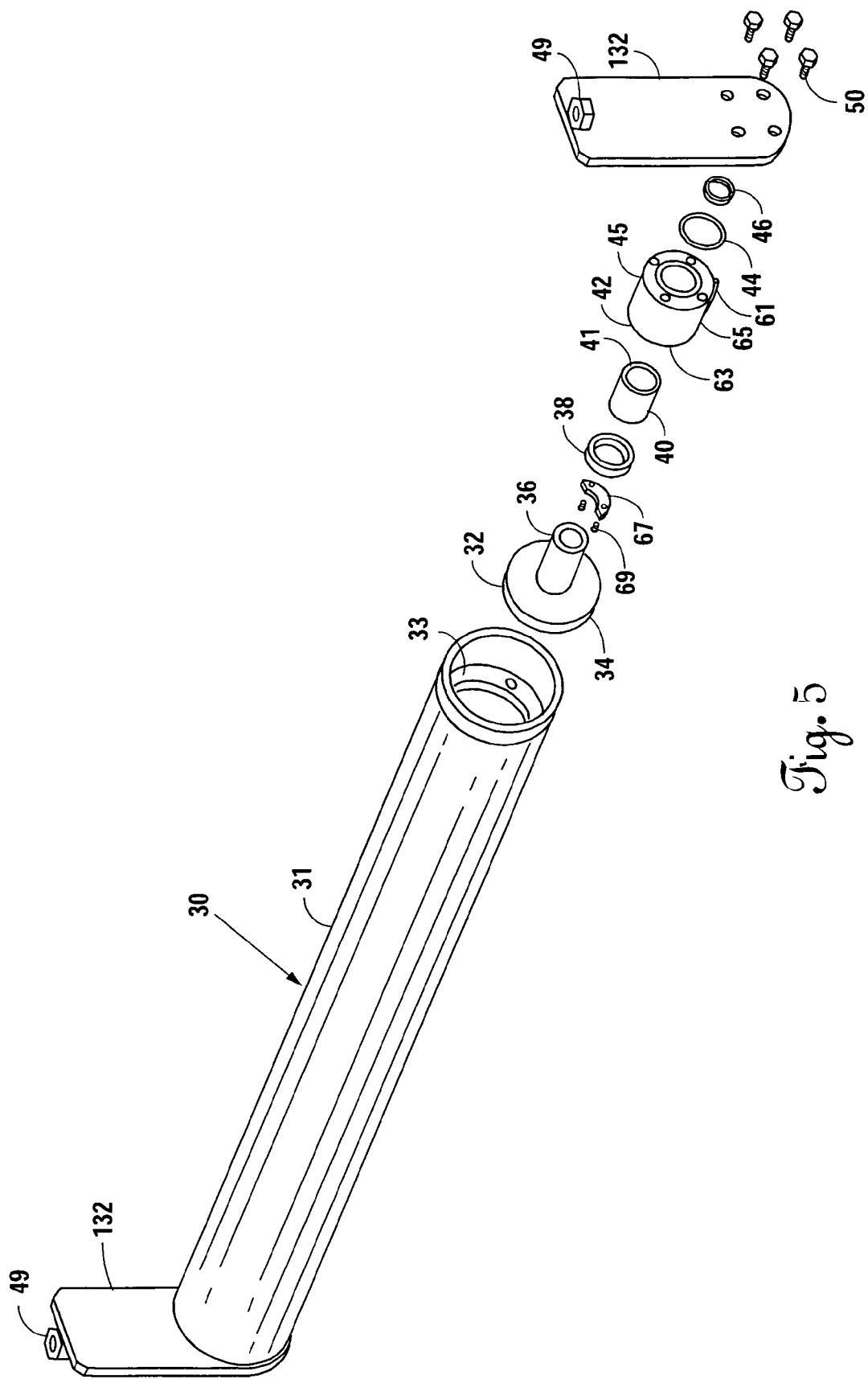
FIG. 5 is an exploded perspective view of the ground roller mounting system including the seal protection and stationary helical flight.

Shown in FIG. 5 is an embodiment providing self cleaning of the dirt and debris which becomes caught in the ends of the hollow cylindrical member 31 during mowing. The reference numbers used in FIG. 5 are the same as shown in FIG. 3 but for the additional features. Welded to the outside of the bearing housing 42 is a helical flight 61 which remains stationary within the rotating hollow cylindrical member 31. Those of ordinary skill in the art will understand that use of a stationary helical flight 61 within the rotating hollow cylindrical member 31 will require the construction of a left hand mounting assembly and a right hand mounting assembly to enable the disclosed self-cleaning ground roller mounting assembly system 10 to operate. Further, the direction of rotation of the hollow cylindrical member 31 now becomes an important consideration. As the hollow cylindrical member 31 turns the dirt and debris will contact the inboard end 63 of the stationary helical flight 61. Such contact will remove the dirt and debris from the interior of the hollow cylindrical member 31 which has accumulated during mower operation. As the hollow cylindrical member 31 rotates, the stationary helical flight 61 will cause the dirt and debris to slide along the face 65 of the stationary helical flight 61 away from the hollow cylindrical member 31. The stationary helical flight 61 is preferable located near the bottom of the bearing housing 42.

Also included is an optional seal guard 67 attached to the inboard end of the bearing housing near the inboard end 63 of the stationary helical flight 61. The seal guard 67 is an arcuate piece attached to the bearing housing 42 with treaded fasteners 69. Use of the seal guard 67 helps eliminate and remove excess debris from the seal area and prevents a build up of dirt and debris on the seal 38. Removal of threaded fasteners 69 enables removal of the seal guard 67 and replacement of the seal 38.

While the disclosed system has been described according to its preferred and alternate embodiments, those of ordinary skill in the art will understand that still other embodiments may be enabled by the foregoing disclosure. Such other embodiments shall be included within the scope and meaning of the appended claims.

What is claimed is:

1. A self-cleaning mower ground roller assembly mounting system for use with mounting shafts extending from ends of a ground roller assembly, said ground roller assembly mounting system comprising:
    stationary sleeve bearings constructed and arranged to permit rotation and axial movement of the mounting shafts therein, said stationary sleeve bearings having an inboard end and an outboard end;
    housings for said stationary sleeve bearings constructed and arranged for frictional interfitment around said stationary sleeve bearings, said housing for said stationary sleeve bearing including a stationary helical flight constructed and arranged to fit within the ground roller;
    seals mounted within said stationary bearing housings on said inboard ends of said stationary sleeve bearings;
    thrust bearings placed mounted within said stationary bearing housings adjacent to said outboard end of said stationary sleeve bearings.

2. The mounting system as defied in claim 1 further including a seal guard attached to said stationary bearing housing.

3. The mounting system as defined in claim 1 wherein said stationary sleeve bearings are greaseless bearings.

4. The mounting system as defined in claim 1 wherein said housings for said stationary bearings are mounted to be vertically positionable with respect to a mower housing.

5. The mounting system as defined in claim 3 further including o-rings substantially surrounding said outboard ends of said stationary sleeve bearings.

6. The mounting system as defined in claim 5 wherein said seals on the inboard ends of said stationary sleeve bearings and said o-ring on the outboard end of said stationary sleeve bearings protect said stationary sleeve bearings from the entry of dirt or debris.

7. A self-cleaning ground roller assembly for use on a flail mower, said ground roller assembly comprising:
    an hollow cylindrical member having a mounting shaft extending from either end of said hollow cylindrical member;
    stationary sleeve bearings positioned for both rotatable and slideable engagement with each of said mounting shafts, each of said stationary sleeve bearings having an inboard end and an outboard end;
    housings for fixedly mounting and positioning each of said stationary sleeve bearings to engage each of said mounting shafts, said housings including a stationary helical flight constructed and arranged for interfitment within the ground roller;
    a bearing seal mounted within each of said stationary housings adjacent to said inboard end;
    a thrust bearing mounted within each of said stationary housings adjacent to said outboard end.

8. The self-cleaning ground roller assembly as defined in claim 7 further including a seal guard attached to said housings.

9. The self-cleaning ground roller assembly as defined in claim 7 wherein said stationary sleeve bearings are greaseless journal bearings.

10. The self-cleaning ground roller assembly as defined in claim 7 wherein said stationary housing is vertically positionable with respect to the housing for the flail mower.

11. The self-cleaning ground roller assembly as defined in claim 9 wherein o-rings are placed substantially around the outboard end of said stationary sleeve bearings.

12. The self-cleaning ground roller assembly as defined in claim 11 wherein said seals and said o-rings are used to block dirt and debris from entering the interface between said stationary sleeve bearings and said ground roller mounting shaft.

* * * * *